(12) United States Patent
Pomerleau (10) Patent No.: US 9,957,848 B2
(45) Date of Patent: May 1, 2018

(54) PIVOTING VARIABLE CAM FOLLOWER

(71) Applicant: Daniel Guy Pomerleau, Calgary (CA)

(72) Inventor: Daniel Guy Pomerleau, Calgary (CA)

(*) Notice: Subject to any disclaimer, the term of this patent is extended or adjusted under 35 U.S.C. 154(b) by 85 days.

(21) Appl. No.: 15/114,371

(22) PCT Filed: Mar. 26, 2015

(86) PCT No.: PCT/CA2015/000182
§ 371 (c)(1),
(2) Date: Jul. 26, 2016

(87) PCT Pub. No.: WO2015/143542
PCT Pub. Date: Oct. 1, 2015

(65) Prior Publication Data
US 2016/0341077 A1 Nov. 24, 2016

Related U.S. Application Data

(60) Provisional application No. 61/970,987, filed on Mar. 27, 2014.

(51) Int. Cl.
*F01M 11/02* (2006.01)
*F01L 1/16* (2006.01)
(Continued)

(52) U.S. Cl.
CPC .................. *F01L 1/16* (2013.01);
*F01L 1/08* (2013.01); *F01L 1/146* (2013.01);
*F01L 1/181* (2013.01);
(Continued)

(58) Field of Classification Search
CPC ... F01L 1/0532; F01L 1/08; F01L 1/18; F01L 1/34416; F01L 2003/11; F01L 3/22;
(Continued)

(56) References Cited

U.S. PATENT DOCUMENTS 2,307,926 A  1/1943  Griffith
2,969,051 A  1/1961  Webster
(Continued)

FOREIGN PATENT DOCUMENTS

CA  2257437  1/1999
CA  2417674 A1  2/2002
(Continued)

OTHER PUBLICATIONS

PCT International Search Report, PCT/CA2015/000182, dated Jun. 10, 2015.
(Continued)

*Primary Examiner* — Jorge Leon, Jr.
(74) *Attorney, Agent, or Firm* — TraskBritt, P.C.

(57) ABSTRACT

A cam follower for operable attachment to a valve lifter assembly for use with a variable cam lobe camshaft in a variable valve timing system includes a housing with a central cavity and a mushroom head with a stem pivotably connected to the housing in the central cavity, the mushroom head having a radiused surface for contacting a cam lobe surface. The cam follower is used in combination with a variable cam surface of an axially displaceable camshaft to obtain improvements in idling speed and volumetric efficiency.

16 Claims, 7 Drawing Sheets

(51) Int. Cl.
*F16H 53/06* (2006.01)
*F01L 1/08* (2006.01)
*F01L 1/14* (2006.01)
*F01L 1/053* (2006.01)
*F01L 1/344* (2006.01)
*F01L 3/22* (2006.01)
*F01L 3/00* (2006.01)
*F01L 1/18* (2006.01)
*F01L 13/00* (2006.01)
*F01L 1/047* (2006.01)

(52) U.S. Cl.
CPC .......... *F01L 13/0042* (2013.01); *F16H 53/06* (2013.01); *F01L 1/0532* (2013.01); *F01L 1/18* (2013.01); *F01L 1/34416* (2013.01); *F01L 3/22* (2013.01); *F01L 13/0047* (2013.01); *F01L 2001/0476* (2013.01); *F01L 2003/11* (2013.01); *F01L 2013/0078* (2013.01); *F01L 2105/00* (2013.01); *F01L 2810/02* (2013.01); *F01L 2820/01* (2013.01)

(58) Field of Classification Search
CPC .............. F01L 13/0042; F01L 13/0047; F01L 2013/0078; F01L 2810/02
USPC .............. 123/90.18, 90.2, 90.35, 90.44, 90.6
See application file for complete search history.

(56) References Cited

U.S. PATENT DOCUMENTS

| | | | |
|---|---|---|---|
| 3,001,177 A | 9/1961 | Adler | |
| 3,618,574 A | 11/1971 | Miller | |
| 4,739,675 A | 4/1988 | Connell | |
| 4,885,952 A * | 12/1989 | Connell | F01L 1/14 123/90.48 |
| 4,995,353 A * | 2/1991 | Stegeman | F01L 1/08 123/90.48 |
| 5,205,247 A * | 4/1993 | Hoffman | F01L 1/12 123/90.16 |
| 5,924,397 A | 7/1999 | Moriya et al. | |
| 5,937,811 A * | 8/1999 | Motosugi | F01L 1/185 123/90.18 |
| 5,988,127 A | 11/1999 | Hasegawa et al. | |
| 6,244,229 B1 | 6/2001 | Nakano et al. | |
| 6,467,166 B1 * | 10/2002 | Saiki | F01L 1/08 29/558 |
| 6,474,281 B1 * | 11/2002 | Walters | F01L 1/143 123/90.17 |

FOREIGN PATENT DOCUMENTS

| | | |
|---|---|---|
| CH | 304494 A | 1/1955 |
| DE | 19755937 A1 | 6/1998 |
| WO | 0026511 A1 | 5/2000 |
| WO | 0042300 A1 | 7/2000 |
| WO | 0212682 A1 | 2/2002 |
| WO | 2015143542 A1 | 10/2015 |

OTHER PUBLICATIONS

PCT International Written Opinion, PCT/CA2015/000182, dated Jun. 10, 2015.

* cited by examiner

Fig. 8

PIVOTING VARIABLE CAM FOLLOWER

FIELD OF THE INVENTION

The invention relates to improved cam contacting devices for use in internal combustion engines and preferably for use in internal combustion engines having variable valve actuation. In particular, a cam follower with a pivoting mushroom head cam follower is used in combination with a variable cam surface of an axially displaceable camshaft to obtain improvements in idling speed and volumetric efficiency.

BACKGROUND OF THE INVENTION

The design of an internal combustion engine requires numerous trade-offs between conflicting design or performance parameters and particularly with respect to camshaft design and thereby valve actuation.

For example, in the design of an engine, a designer may wish to minimize exhaust emissions and provide increased fuel economy without compromising satisfactory engine performance. In the past, the design of such an engine would be limited by such conflicting parameters leading the designer to compromise with the design to achieve a balance between the parameters. As such, designers will often focus on a primary performance goal (such as lower emissions) which may be detrimental to the desired engine performance (such as torque or idle stability). Such compromises are often caused by the designer's failure to incorporate breathability into the engine, as represented by optimal intake of fuel and air and the exhaust of spent gases after combustion.

The breathability of an engine is primarily determined by the physical structure of the camshaft, cam lobes, valve lifters (and the associated push-rods, or rocker arms, if applicable). In particular, the physical shapes or profiles of the cams and their relative orientation with respect to one another determine the timing of the intake and exhaust valve opening, the duration of opening, the valve lift, and the timing of valve closure which, along with the orientation of respective intake and exhaust valves about the camshaft, determine the power map of the cylinder.

As a result of the high-temperature, high-pressure and mechanical speed of the working environment as well as the physical complexity of these components, adjustment of valves during operation of the engine is difficult and accordingly, most engines utilize a fixed cam lobe design wherein the relative parameters of valve operation does not vary with engine speed. As a result, fixed cam lobe engines require trade-offs between the performance parameters of the engine.

More specifically, the function of the camshaft is to open and close valves at the proper time, to fill the cylinders before combustion and to empty them after combustion. The cam lobes are mounted on the camshaft and have a profile, which determines the timing of valve opening, the valve lift, and the duration of opening and the timing of valve closing. The cam followers are in intimate contact with the surfaces of the cams and ride these surfaces in order to impart opening/closing forces to the valves. The opening and closing of valves is thereby timed to the rotation of the camshaft, which in turn is controlled by the crankshaft.

Accordingly, the physical dimensions or shapes of the cams, lifters and the orientation of the cams with respect to one another are parameters, which can be varied in order to obtain desired engine performance.

With respect to the physical dimensions or design of a cam, various terms are generally used to describe the shape of a cam and the physical movements of a valve. For example, the "base circle" of the cam defines the period that the valve is closed, the "clearance ramp" defines the time of transition between closure and measurable valve lifting, the "flank" or "ramp" provides the time for and characteristics of valve opening, the nose defines the time of full valve opening and maximum opening displacement and the "duration" defines the time that the valve is off its seat.

Each of these parameters of a cam cannot be independently controlled during engine operation and therefore require compromises between what the physical dimensions of a cam will allow in relation to the other parameters. For example, duration is a compromise between opening the valves long enough to fill and/or evacuate the cylinders to the loss of dynamic compression by opening the valves too long and increasing lift increases power but is limited by lifter diameter.

With respect to the design of lifters (or tappets), the technology of lifters is variable between engines. Generally, the primary goal of lifter design is to maintain contact between the lifter surface and cam surface while minimizing noise during operation. The two main classes of lifters are solid lifters and hydraulic lifters with each class providing variable contact ends including flat ends, mushrooms and rollers. The use of hydraulic lifters generally reduces valve lash and noise. A flat tappet-cam normally has a slight taper across its surface whereas the corresponding tappet end surface is normally marginally convex in order to compensate for mis-aligned lifter bores.

Roller lifters include a wheel or roller in contact with the cam. Roller lifters allow for highly aggressive ramp profiles and, as a result, require high valve spring tensions to keep the roller in contact with the cam. Roller lifters also reduce frictional losses between the lifter and cam and thereby will increase the overall power or efficiency of the engine.

Mushroom lifters have a bulge at the end and are used to provide more lift per duration.

The relative orientation of the intake and exhaust cams with respect to one another contributes to defining the power map of the engine. Specifically, the lobe separation angle or overlap determines the time during which the intake and exhaust valves are opened simultaneously, wherein a wider lobe separation angle generally improves idle quality, idle vacuum and top-end power whereas a narrower lobe separation angle decreases idle quality but provides better mid-range torque.

Degreeing a cam is also a parameter which can be used to affect engine performance and refers to altering the point where the cam activates the valves in relation to the crankshaft. Specifically, retarding the camshaft, that is, opening a valve later relative to the crankshaft moves the power up the rpm band and can increase horsepower while decreasing lower end torque. In contrast, advancing the camshaft (opening the valves earlier) has the opposite effect.

In order to address some of the problems associated with fixed cam timing, variable cam timing systems have been designed. Generally, such systems provide a cam lobe having a three-dimensional surface and a lifter which is allowed to move axially over the three-dimensional cam surface. Accordingly, the axial position of the camshaft will determine the specific cam profile which controls valve timing.

For example, by diluting the in-cylinder mixture by reducing fuel intake characteristics by providing shorter intake times increases fuel economy but decreases the torque response of the engine. In contrast, by enriching the in-cylinder mixture by increasing fuel intake times by providing more lift and duration leads to an increase in horsepower. A variable valve timing system can accommodate such conflicting objectives by providing different cam profiles depending on the speed of the engine (revolutions per minute) thereby contributing to improvements in the breathability of the engine and increasing the manifold pressure.

In high performance applications, the current state-of-the-art recognizes the single axis roller or wheel based lifter as the optimal performance enhancing device for valve train operation. However, as the desire for higher engine speed has grown, it has been found that wheel based lifters will fail under the higher tension springs utilized in engines configured for higher speeds. Typically, failure occurs in two ways; roller bearing failure in the wheel itself and/or the catastrophic failure of the lifter, both a result of wheel "flat spotting" which produces vibrations in the valve lifter and valve train.

Furthermore, existing wheel-based lifter designs do not provide direct delivery of lubrication to the roller bearing but rather lubrication occurs indirectly which decreases the ability to dissipate heat from the bearing surfaces. Accordingly, bearing life may be reduced as the wheel may be in direct contact with the bearing race with minimal oil film between the two surfaces.

To achieve maximum bearing life in a single axle based system, the designer must balance three parameters given that the wheel diameter is maximized within the confines of the lifter body. These three factors are roller bearing diameter, axle diameter and wheel thickness. Each of these parameters must be varied to minimize the compressive and contact stresses on the bearing surfaces, minimize the stresses in the axle and minimize the deflection of the axle which directly affects the contact stresses within the roller bearings.

While past variable valve timing systems have been disclosed, for example in U.S. Pat. No. 2,969,051, German publication DE 197 55 937, Swiss publication CH 304494 and U.S. Pat. No. 2,307,926, and PCT Publication No. W002/12682, the lifter/cam contacting systems have not experienced widespread implementation or success. The reason for this lack of success is postulated to be a result of failures experienced in the actual implementation of such systems. That is, within the harsh operating conditions of an internal combustion engine, it is speculated that previous variable valve timing systems experience bearing failure within the bearings/races of these systems.

SUMMARY OF THE INVENTION

In accordance with one aspect of the present invention, there is provided a cam follower for operable attachment to a valve lifter assembly for use with a variable cam lobe camshaft in a variable valve actuation system, the cam follower comprising: a housing with a central cavity; and a mushroom head with a stem pivotably connected to the housing in the central cavity, the mushroom head having a radiused surface for contacting a cam lobe surface.

In certain embodiments, the mushroom head has a partially radiused cam surface and partially flattened cam contacting surface.

In certain embodiments of the cam follower, the edges of the radiused surface are curved to facilitate sliding engagement of the radiused surface with edges of the cam lobe surface.

In certain embodiments of the cam follower, the stem is pivotably connected to the housing by an axle extending through openings in opposing sides of the housing and through the stem of the mushroom head.

In certain embodiments of the cam follower, the housing is operatively connected to a lubrication system for providing lubrication to the mushroom head and the cam lobe surface, the lubrication system comprising: at least one channel in the housing extending from a lubricant reservoir in the valve lifter assembly to at least one of the openings in the opposing sides of the housing; at least one lubricant receiving port in the axle for receiving lubricant passing through the channel in the housing and at least one lubricant delivery port in the axle for passing the lubricant from the axle to the stem of the mushroom head; and a channel in the mushroom head extending from the stem to the radiused surface for passing the lubricant to the radiused surface, thereby providing lubrication to the radiused surface and the cam lobe surface.

In certain embodiments of the cam follower which include the lubrication system, a pair of channels is included, each channel of the pair extending from the reservoir to one of the openings in opposing sides of the housing. At least one lubricant receiving port in the axle is provided by a pair of lubricant receiving ports in the axle and each lubricant receiving port is substantially aligned with a corresponding channel of the pair of channels.

In certain embodiments of the cam follower which include the lubrication system, the lubricant delivery port in the axle is located substantially in the longitudinal center of the axle.

In certain embodiments of the cam follower which include the lubrication system, the channel in the mushroom head is located substantially in the longitudinal center of the mushroom head and substantially aligned with the lubricant delivery port in the axle.

Another aspect of the present invention is a valve lifter assembly for use with a variable cam lobe camshaft in a variable valve actuation system within an internal combustion engine (ICE), the valve lifter assembly comprising the cam follower of any of the embodiments described herein which is operatively connected to a valve lifter or formed integrally with a valve lifter within the ICE.

Another aspect of the present invention is a rocker arm valve lifter assembly with a pivoting cam follower for use with a variable cam lobe camshaft in a variable valve actuation system within an internal combustion engine (ICE), the rocker arm valve lifter assembly comprising: a rocker arm with a cam follower housing integrally formed there within, the housing having a central cavity; and a mushroom head with a stem pivotably connected to the housing in the central cavity, the mushroom head having a radiused surface for contacting a cam lobe surface.

In certain embodiments of the rocker arm valve lifter assembly, the edges of the radiused surface are curved to facilitate sliding engagement of the radiused surface with edges of the cam lobe surface.

In certain embodiments of the rocker arm valve lifter assembly, the stem is pivotably connected to the housing by an axle extending through opposing sides of the housing and through the stem of the mushroom head.

In certain embodiments of the rocker arm valve lifter assembly, the housing is operatively connected to a lubrication system as described herein.

Another aspect of the present invention is a variable valve actuation system within an internal combustion engine (ICE) comprising: a variable lobe camshaft having a plurality of cam lobes, each cam lobe for controlling the opening of a corresponding valve within the ICE; a plurality of valve lifter assemblies according to embodiments described herein, in operative engagement with corresponding cam lobes of the variable lobe camshaft; and a plurality of valves in operative engagement with corresponding valve lifter assemblies; the plurality of valves further in operative engagement with corresponding intake ports or exhaust ports of one or more cylinder combustion chambers.

In certain embodiments of the variable valve timing system, each cam lobe has first and second cam lobe faces at opposite ends of each cam lobe and the apex of the first and second cam lobe faces are axially displaced with respect to one another to provide cam lobe phasing In certain embodiments of the variable valve timing system, the camshaft is configured for angular displacement relative to a corresponding crankshaft to provide cam phasing.

In certain embodiments of the variable valve timing system, the intake ports are surrounded with valve seats provided with a plurality of fuel injector ports.

In certain embodiments of the variable valve timing system which include a plurality of fuel injector ports, there are 8 equi-spaced fuel injector ports in each valve seat.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION OF THE INVENTION

Rationale

Axial displacement of a camshaft has been accomplished using hydraulic pistons or mechanical actuators pushing on a clutch-like bearing assembly. This activation can be provided relative to changes in rotary speed either automatically or linked to throttle position. It is understood that springs can be used to recover and resist valve movements. Air bags, hydraulic systems and desmodromic systems may be used with this type of variable valve technology instead of springs. Alteration of valve timing during the operation of the engine allows engine performance to be modified to match operating conditions. Variations in the relative shape of a given cam within a variable cam system can enable independent phasing of the intake cams, independent phasing of the exhaust cams, phasing the intake and exhaust equally or phasing of the exhaust and intake cams independently of one another.

In previous efforts to produce an improved cam follower for a variable cam lobe, a ball bearing was tested as the variable cam lobe follower (PCT Publication No. WO02/12682) and was found to operate properly but the point contact load caused the cam surface to deteriorate rapidly. It was therefore recognized that an alternative cam lobe follower should be provided with a larger surface area to disperse the point contact load.

The cam lobe follower of the valve lifting assembly provided according to certain embodiments described herein is in the general shape of a mushroom head. Certain embodiments have a mushroom head with a radiused approach surface to enable it to traverse the slope of the cam surface. An additional useful feature of certain embodiments is provided by a pivot point in the "stem" of the mushroom shape. When fixed to a support surface, the mushroom head is thus provided with the means to pivot about its pivot point, thereby allowing the slope of the cam-contacting mushroom head surface to change as the slope of the cam lobe changes. This allows the cam contacting surface to adapt to any continuous slope from one end of a cam to the other.

Because the point load of the cam follower is dispersed relative to ball bearing or roller-type cam followers as a result of the larger surface area provided by the mushroom head, certain embodiments of the cam lobe follower of the present invention allow higher spring pressures to be tolerated relative to lifter assemblies with conventional roller-type cam followers. The inventive cam follower therefore allows for the lift and duration of the cam to be optimized over a broader range of engine speed, thereby increasing engine efficiency.

With respect to variable lift and duration mechanics, embodiments of the present invention provide the means to optimize air velocity thereby leading to improvements in fuel droplet atomization. An additional advantage of this system will be gained by use of the widest cam lobes possible. This feature will be cylinder-controlled with appropriate valve pushrod or rocker arm spacing.

Introduction

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Variable Lobe Camshaft

Figure 1:
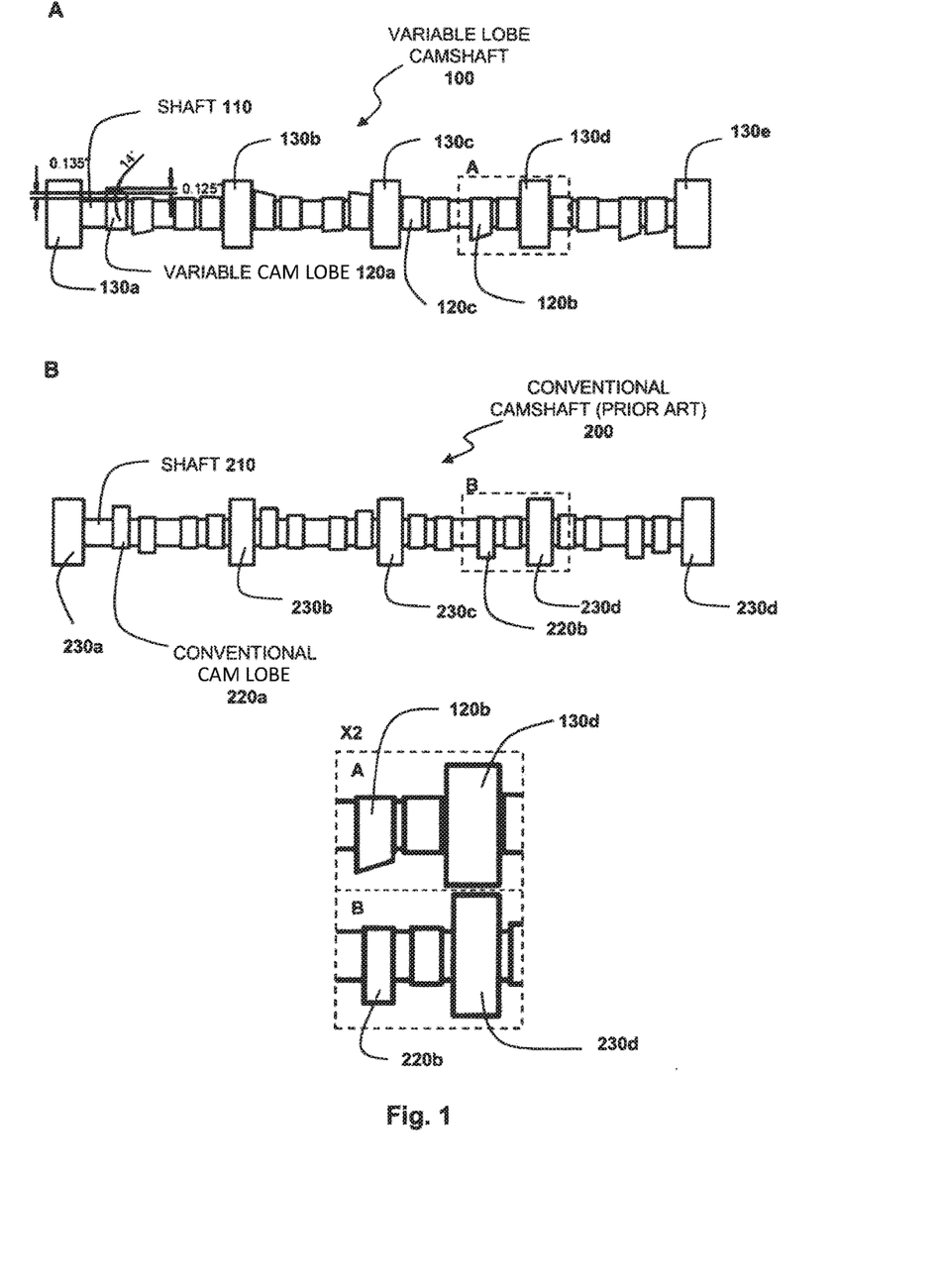
FIG. 1A is a side elevation view of a camshaft 100 which includes variable cam lobes appropriate for use in combination with certain aspects of the present invention. Inset A shows a 2-fold magnification of a section of the subject camshaft for side-to-side comparison with a similar section of the conventional camshaft of FIG. 1B.
FIG. 1B is a side elevation view of a conventional camshaft 200 with conventional cam lobes. This side elevation view is obtained by 90 degree rotation of the view shown in FIG. 1A. Inset B shows a 2-fold magnification of a section of this conventional camshaft for side-to-side comparison with a similar section of the subject camshaft of FIG. 1A.

A variable lobe camshaft appropriate for use in certain aspects of the invention will now be described with reference to FIG. 1. Referring now to FIG. 1A, there is shown a variable lobe camshaft 100 appropriate for axial movement for the purpose of providing variable valve timing in conjunction with an appropriately designed valve lifter assembly to be described herein below. This particular variable lobe camshaft 100 is designed for use with a V-8 engine (as will be discussed in more detail hereinbelow in context of FIG. 8). The skilled person will recognize that alternative embodiments designed for use with smaller engines having fewer cylinders will have camshafts with fewer variable cam lobes while retaining the features of the present invention.

The variable lobe camshaft 100 is formed of a shaft 110 having a series of variable cam lobes 120 which, in this particular embodiment are 1 inch wide and based on an LS-1 style Chevrolet camshaft. In this particular embodiment, there are four variable cam lobes 120 located between each pair of cam journals (the pairs of cam journals are 130*a* and 130*b*; 130*b* and 130*c*; 130*c* 130*d*; and 130*d* and 130*e*. In order to preserve clarity, only three of the variable cam lobes are labeled (120*a*, 120*b* and 120*c*). It is to be understood that although some of the cams of FIG. 1A appear to be shown as rectilinear forms, each one of them is provided with a sloped surface in a manner similar to that of the specific variable cam lobes 120*a* and 120*b* and that the rectilinear appearance of variable cam lobe 120*e*, for example, is due to its elongated side pointing away from the perspective of the viewer. In certain embodiments, all of the cam lobes controlling the valves for the intake ports have the same dimensions and all of the cam lobes controlling the valves for the exhaust ports have the same dimensions. In certain embodiments, all of the cam lobes of the camshaft 100 have the same dimensions.

The dimension notations located at the left side of the shaft 110 indicate features of representative variable cam lobe 120*a*. Alternative embodiments will have different dimensions. It is seen that the distance between the highest and lowest points of the 14 degree sloped cam surface is 0.125 inches and that the distance between the lowest point of the sloped cam surface and the surface of the shaft 110 is 0.135 inches.

A conventional camshaft 200 for use with a V-8 engine is shown in FIG. 1B and is shown for comparison with camshaft 100 described above. Camshaft 100 is designed as a significant improvement to camshaft 200. Camshaft. 200 has a shaft 210 with conventional cam lobes 220*a*, 200*b* and cam journals 230*a*, 230*b*, 230*c*, 230*d* and 230*e*. It is seen in the comparative insets A and B that the variable cam lobe 120*b* is wider than its counterpart conventional cam lobe 220*b* and that the cam journal 130*d* of camshaft 100 is wider than its counterpart cam journal 230*d* in conventional camshaft 200. It is to be understood that this applies to all of the cam lobes and cam journals of the two camshafts 100 and 200 shown in FIGS. 1A and 1B respectively.

The extra thickness of the lobes 120 and the cam journals 130 of camshaft 100 is provided to derive an advantage from the axial movement of the camshaft 100. The wider cam lobes allow for a lower angle of climb for the valve lifter. In rocker arm valve systems (described in more detail hereinbelow) the ratios can vary from 1.4 to 1.8. The effective leverage of the arm (and thus the force it can exert on the valve stem) is determined by the rocker arm ratio, the ratio of the distance from the rocker arm's center of rotation to the tip divided by the distance from the center of rotation to the point acted on by the camshaft or pushrod. Current automotive design favors rocker arm ratios of about 1.5:1 to 1.8:1. However, in the past smaller positive ratios (the valve lift is greater than the cam lift) and even negative ratios (valve lift smaller than the cam lift) have been used. Therefore, only slight changes in lobe height can have a dramatic effect on air flow into the combustion chamber.

Valve Lifter Assembly

A valve lifter assembly incorporating an embodiment of the present invention for use in conjunction with a variable lobe camshaft such as camshaft 100, will now be described.

Before discussing the valve lifter assembly relating to the present invention a conventional roller wheel valve lifter assembly will first be discussed to facilitate a comparison and to highlight the advantages of aspects of the present invention. A conventional roller wheel valve lifter assembly 300 for use with conventional camshaft 200 is shown in two different views in FIGS. 2A and 2B.

Figure 2:
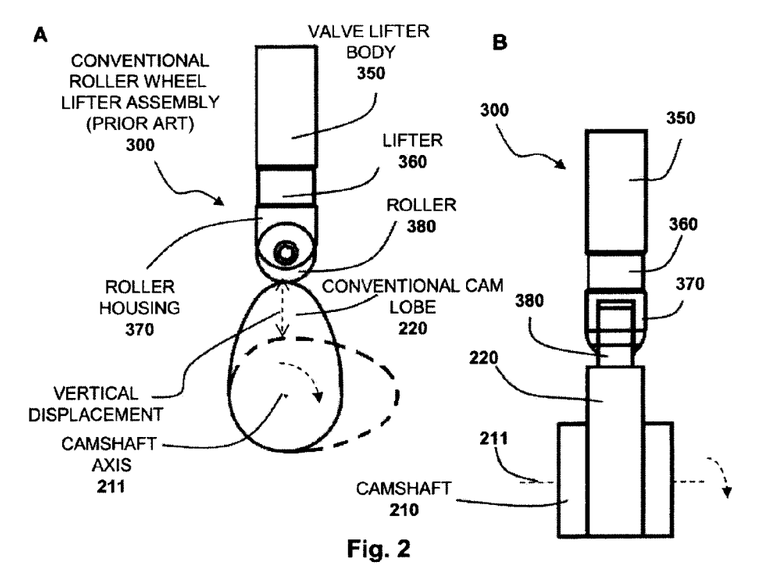
FIG. 2A is a side elevation view of a conventional roller wheel valve lifter assembly 300 with a roller surface 380 for contacting a conventional cam lobe 220 of a conventional camshaft 200 as depicted in FIG. 1B, as seen with the camshaft axis 211 perpendicular to the plane of the page.
FIG. 2B is a side elevation view of a conventional roller wheel valve lifter assembly 300 with a roller surface 380 for contacting a conventional cam lobe 220 of a conventional camshaft 200 as depicted in FIG. 1B, as seen with the camshaft axis 211 parallel to the plane of the page. This side elevation view is obtained by 90 degree rotation of the view shown in FIG. 2A.

FIG. 2A shows a side elevation view of the conventional roller wheel valve lifter assembly 300 in contact with the conventional cam lobe 220 at its apex. The camshaft axis 211 extends outward perpendicularly from the plane of the page. The assembly 300 includes a valve lifter body 350 slidably coupled to a lifter 360 as shown. At the lower end of the lifter is a roller housing 370 and a roller 380 coupled to the roller housing 370.

A 90 degree rotation of cam lobe 220 from the solid-line position leads to the position shown with broken lines and results in the roller 380 moving along the surface of the cam lobe 220 and vertically downward until it reaches the lowermost position of the double broken arrow as shown.

FIG. 2B is a view of conventional roller wheel lifter assembly 300 produced from a 90 degree rotation of the view of FIG. 2A such that the axis 211 of the camshaft 210 is parallel to the plane of the page. Importantly, it is seen that the entire upper surface of the apex of the cam lobe 220 is flat.

Figure 3:
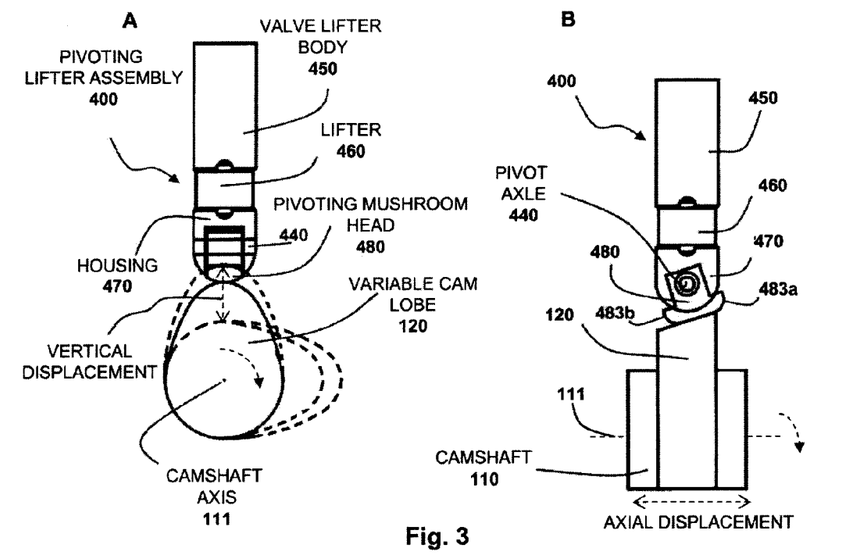
FIG. 3A is a side elevation view of a pivoting mushroom head valve lifter assembly 400 in accordance with one embodiment of the present invention, showing the pivoting mushroom head 480 contacting an intermediate position of a variable cam lobe 120 of a variable lobe camshaft 100 as depicted in FIG. 1A, as seen with the camshaft axis 111 perpendicular to the plane of the page.
FIG. 3B is a side elevation view of a pivoting mushroom head valve lifter assembly 400 in accordance with one embodiment of the present invention, showing the pivoting mushroom head 480 contacting an intermediate position of a variable cam lobe 120 of a variable lobe camshaft 100 as depicted in FIG. 1A, as seen with the camshaft axis 111 parallel to the plane of the page.

FIGS. 3A and 3B provide views of a pivoting valve lifter assembly 400 which incorporates aspects of the present invention. The views of FIGS. 3A and 3B are respectively analogous to those of FIGS. 2A and 2B and will therefore be discussed concurrently. Assembly 400 is for use with a variable lobe camshaft such as camshaft 100 shown in FIG. 1A or other variable lobe camshafts which may have fewer cam lobes. In FIGS. 3A and 3B the axis of the camshaft 110 is indicated at 111. In this particular embodiment, the valve lifter body 450 and lifter 460 are essentially identical to the valve lifter body 350 and lifter 360 of assembly 300 shown in FIGS. 2A and 2B. However, an important difference is seen in that the cam follower part is provided by a pivoting mushroom head 480 which is pivotably supported by housing 470. The housing 470 is provided with a means for supporting a pivot axle 440 in an arrangement shown in greater detail in FIG. 5 described hereinbelow. It is further seen in FIG. 3B that the pivoting mushroom head 480 has curved outer edges 483a and 483b which facilitate the movement of the pivoting mushroom head 480 across the sloped surface of the cam lobe 120.

The slope of the surface of the cam lobe 120 is indicated in FIG. 3A as the combination of solid and broken lines. The solid line indicates the present contact position at an intermediate position along the slope of the cam lobe 120. The uppermost position is indicated with one of the broken lines at the upper end of the broken double arrow. A 90 degree rotation of the camshaft axis 111 leads to the apex being located on the right side of the assembly 400 as shown. In this arrangement, both the uppermost position and intermediate slope positions are shown.

The skilled person will recognize that having a greater range of vertical valve displacement produced by the sloped surface of the cam lobe 120 produces a greater range of valve actuation which is controlled by the axial displacement of the camshaft 110 as indicated in FIG. 3B. When the camshaft 120 is axially displaced to the right, the pivoting mushroom head 480 which is supported by the stationary housing 470 of the stationary lifter assembly 400 moves down the slope of the cam lobe 120, resulting in lower vertical valve displacement. Conversely, when the camshaft 120 is axially displaced to the left, the pivoting mushroom head 480 moves up the slope of the cam lobe 120, resulting in greater vertical valve displacement. Thus, the skilled person will recognize the greater range of timing of opening and closure of the valves provide by these inventive features. The series of cam lobes of the camshaft may vary in terms of lift and duration.

Figure 4:
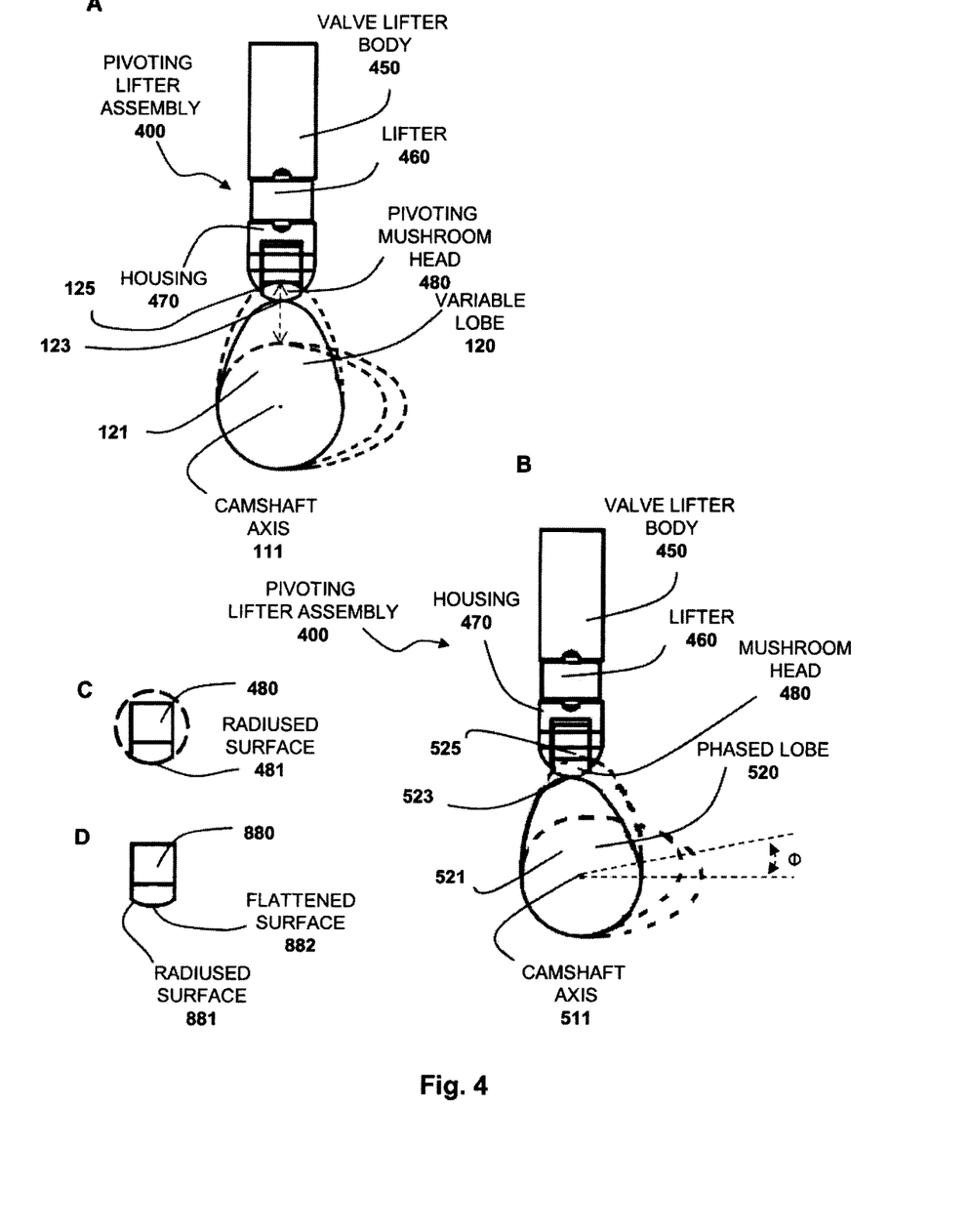
FIG. 4A is a reproduction of the side elevation view of the pivoting lifter assembly 400 shown in FIG. 3A for comparison with FIG. 4B.
FIG. 4B is a side elevation view of the pivoting mushroom head valve lifter assembly 400, showing the pivoting mushroom head 480 contacting a different cam lobe 520 which is subjected to lobe phasing, as seen with the camshaft axis 511 perpendicular to the plane of the page. It is seen that the intermediate upward phase of the phased lobe 520 is asymmetric with respect to the terminal upward phase shown with the dashed line, in contrast to the symmetric variable cam profile shown in FIG. 4A.
FIG. 4C is a side elevation view of the pivoting mushroom head 480 analogous to the view shown in FIG. 4A indicating that its radiused cam contacting surface 481 is perfectly radial.
FIG. 4D is a side elevation view of another embodiment of the pivoting mushroom head 880 which has a partially radiused surface 881 and a partially flattened cam-contacting surface 882.

It is seen in FIG. 4A that the surface of the mushroom head 480 that contacts the surface of the cam is curved or radiused. In this particular embodiment, the shape is perfectly radial as shown by the enclosing dashed circle in FIG. 4C which provides a view of the mushroom head analogous to the view shown in FIG. 4A. As a result, the radiused surface 481 of the mushroom head 480 meets the surface of the cam along a narrow point which extends along the length of the cam contacting surface of the mushroom head 480. Other embodiments of the mushroom head such as mushroom head 880 in FIG. 4D have a partially radiused surface 881 and partially flattened cam contacting surface 882. The partially flattened surface 882 may be useful in distributing the point load of the mushroom head 880 cam follower on the surface of the cam.

Valve Lifter Assembly in Combination with a Phased Cam Lobe

The pivoting lifter assembly 400 provided according to one aspect of the present invention can be used in combination with "phased" cam lobes. Phasing of cam lobes provides a means to advance or retard valve lifting events by a linear "twisting" of the end faces of the cam lobe relative to a neutral position. Phasing of cam lobes is not to be confused with the process known as "cam phasing," which refers to rotation of the angle of the camshaft (forwards or backwards) relative to the crankshaft, thereby causing the valves to open and close earlier or later.

The view of pivoting lifter assembly 400 shown in FIG. 3B is reproduced as FIG. 4A for comparison with the view of FIG. 4B which shows the same assembly 400 in contact with a phased cam lobe 520. As shown in FIG. 4A, the solid line of the cam lobe 120 (non-phased, variable cam lobe) shows a first face 121 with its lobe apex 123 in contact with the pivoting mushroom head 480 and aligned with the second apex 125 of the opposite or second face of the lobe. In comparison, as shown in FIG. 4B, the first lobe face 521 is axially rotated with respect to the second face such that the apexes 523 and 525 of each face are displaced relative to one another by an angle ø. The two dashed lines with apexes directed to the right are a result of a 90 degree rotation of the cam lobe.

The skilled person will recognize that the combination of a pivoting lifter assembly such as the embodiment of assembly 400 with a phased cam lobe provides additional control over valve timing, leading to expectation of significant improvements in engine performance, fuel economy and reduced emissions.

Pivoting Valve Lifter Assembly with Cam Follower Lubrication System

Figure 5:
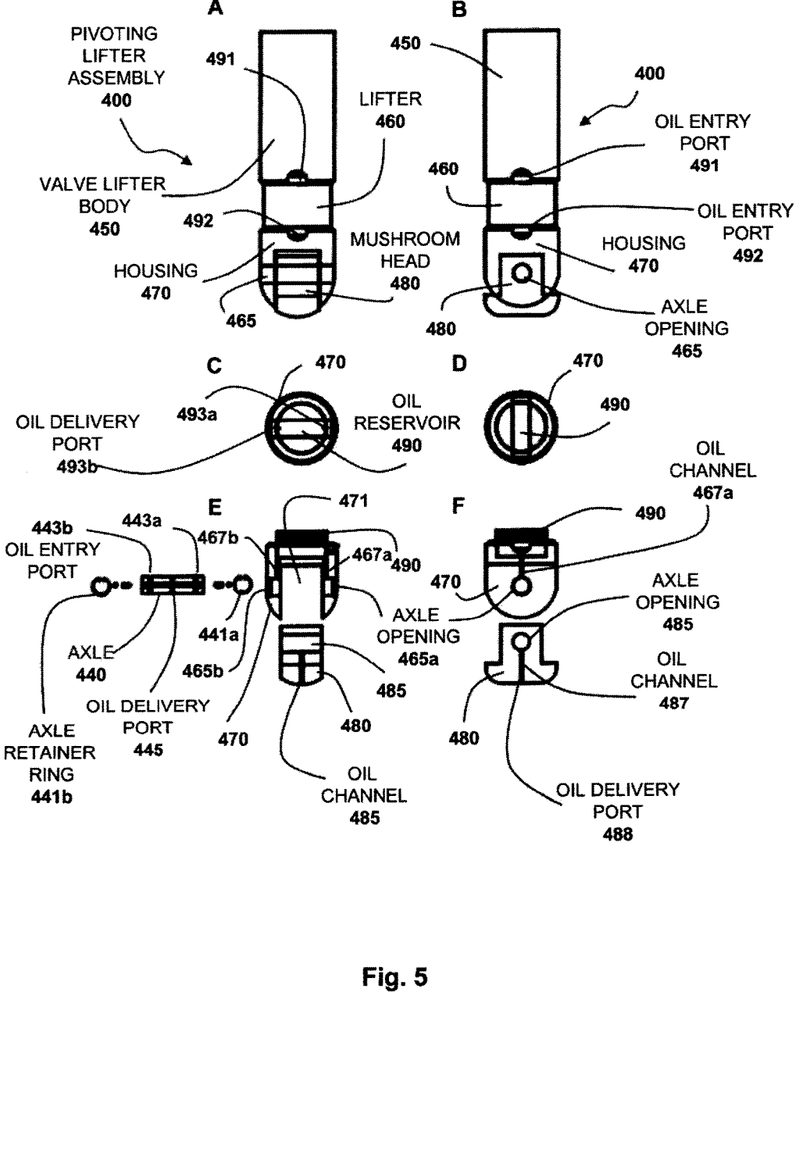
FIG. 5A is a reproduction of the side elevation view of the pivoting mushroom head valve lifter assembly 400 shown in FIG. 3A provided to facilitate visualization of the parts in the top and exploded views of FIG. 5C and FIG. 5E below.
FIG. 5B is a reproduction of the side elevation view of the pivoting mushroom head valve lifter 400 shown in FIG. 3B provided to facilitate visualization of the parts in the top and exploded views of FIG. 5D and FIG. 5F below. This side elevation view is obtained by 90 degree rotation of the view shown in FIG. 5A.
FIG. 5C is a top view of the housing section 470 showing the pressurized oil reservoir 490.
FIG. 5D is another top view of the housing section 470 and pressurized oil reservoir 490. This view is obtained by 90 degree rotation of the view shown in FIG. 5C.
FIG. 5E is an exploded view of the lower end of the side elevation view of the pivoting mushroom head valve lifter assembly 400 shown in FIG. 5A.
FIG. 5F is an exploded view of the lower end of the side elevation view of the pivoting mushroom head valve lifter assembly 400 shown in FIG. 5B.

Another embodiment of the valve lifter assembly 400 is shown in FIG. 5 and includes a system for lubricating the pivoting mushroom head 480 and cam lobe surface (not shown in FIG. 5). FIGS. 5A and 5B show the same views of the assembly 400 which are shown in FIGS. 3A and 3B in order to facilitate an understanding of the additional features illustrated in FIGS. 5C and 5D (alternate top views of the housing 470), 5E and 5F (exploded views of the housing 470 and components associated therewith). The additional features include oil entry ports 491 and 492 in the valve lifter body 450 and in the housing 470, respectively, which allow oil to enter a pressurized oil reservoir 490.

The reservoir 490 is partially contained within the housing 470 (as seen in FIG. 5E) and partially within the interior of the lifter 460. The reservoir 490 is provided with oil delivery ports 493a and 493b, through which oil enters the reservoir 490.

The housing 470 has an open central cavity 471 to accommodate the mushroom head 480. The sides of the housing 470 have axle openings 465a and 465b and the mushroom head 480 is also provided with an axle opening 485. An axle 440 is threaded through the axle openings 465a, 485 and 465b. The axle 440 is then retained on the housing 470 by axle retainer rings 441a and 441b. This arrangement provides pivotable attachment of the mushroom head 480 to the housing 470, thereby enabling the lower surface of the mushroom head 480 to follow a sloped cam surface. The housing 470 is provided with a pair of oil channels 467a and 467b which allow fluid to flow from the oil delivery ports 493a and 493b in the reservoir 490 to their respective axle openings 465a and 465b. The axle 440 is also provided with oil delivery ports 443a and 443b which receive fluid from respective axle openings 465a and 465b, thereby allowing oil to enter the hollow interior of the axle 440 where it subsequently exits through a central oil delivery port 445 and to also drip over the sides of the mushroom head 480. The fluid moving through delivery port 445 then enters oil channel 487 which is centrally located in the mushroom head 480 leading downward therefrom and toward its lower cam contacting surface, exiting at oil delivery port 488 to provide lubrication of the sliding engagement between the cam-contacting surface of the mushroom head 480 and the cam lobe surface.

In summary, the lubrication system of the pivoting valve lifter assembly 400 moves lubricant in the following pathway: 491/492-490-493a/493b-467a/467b-443a/443b-445-485-488, where it then provides lubrication between the lower surface of the mushroom head 480 and the cam lobe surface, thereby reducing the contact surface load of the mushroom head 470 on the cam lobe surface and preventing abrasion thereof.

Hydraulic Lifter Mechanism

Figure 6:
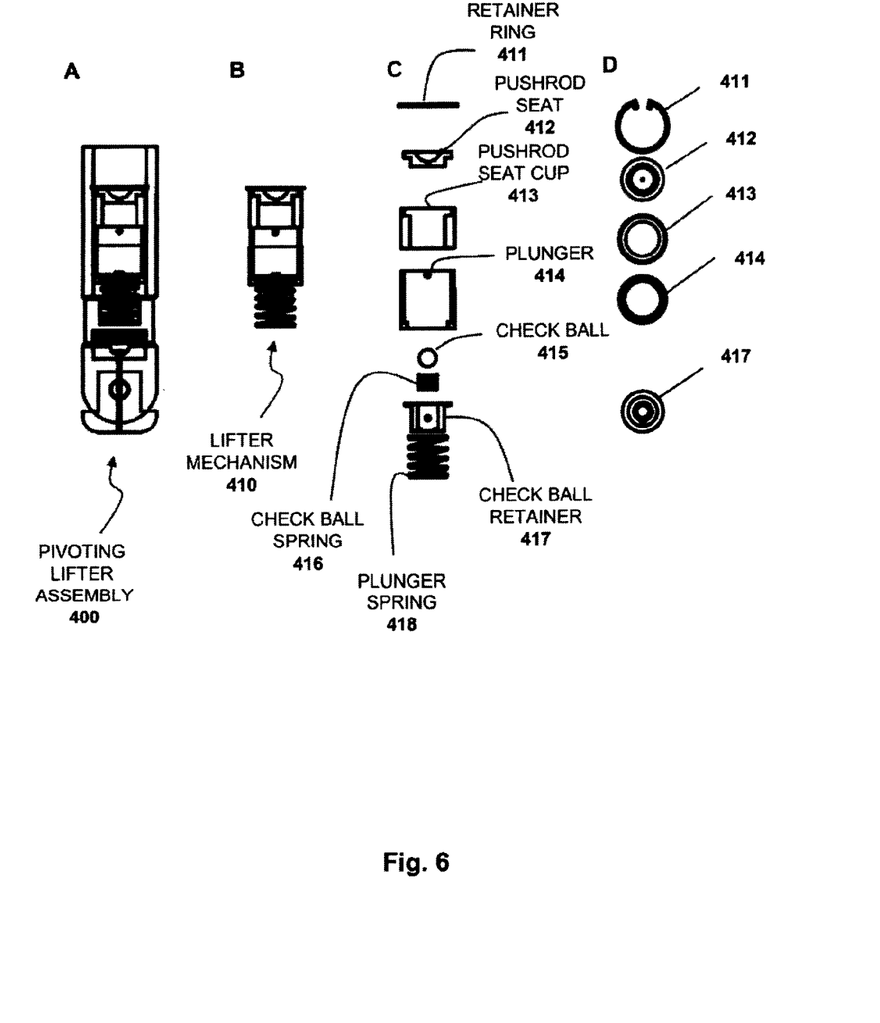
FIG. 6A is a side elevation view of the pivoting lifter assembly 400 provided to facilitate visualization of the parts in the exploded and top views of FIGS. 6C and 6D.
FIG. 6B is a side elevation view of the lifter mechanism 410 provided to facilitate visualization of the parts in the exploded and top views of FIGS. 6C and 6D.
FIG. 6C is an exploded view of the lifter mechanism 410 shown in FIG. 6B.
FIG. 6D is a series of top views of selected parts of the lifter mechanism 410.

Certain embodiments of the valve lifter aspect of the present invention are provided with a hydraulic spring-based hydraulic lifter mechanism, such as the mechanism shown in FIG. 6 which is shown in context of pivoting lifter assembly 400 (FIG. 6A). The exemplary lifter mechanism 410 is shown in FIG. 6B and in exploded view in FIG. 6C. It is seen that the mechanism includes a plunger 414 which moves under the influence of a plunger spring 418 which is coupled to the plunger 414 with check ball 415, check ball spring 416 and check ball retainer 417. The upper end of the plunger 414 is coupled to a pushrod seat cup 413 which holds a pushrod seat 412 held in place with a retainer ring 411. Top views of selected components are shown in FIG. 6D. This mechanism ensures smooth operation of the lifter component of the assembly 400.

The skilled person will recognize that embodiments of the pivoting valve lifter may also be combined with solid lifters.

Rocker Arm-Based Pivoting Valve Lifter Assembly

Figure 7:
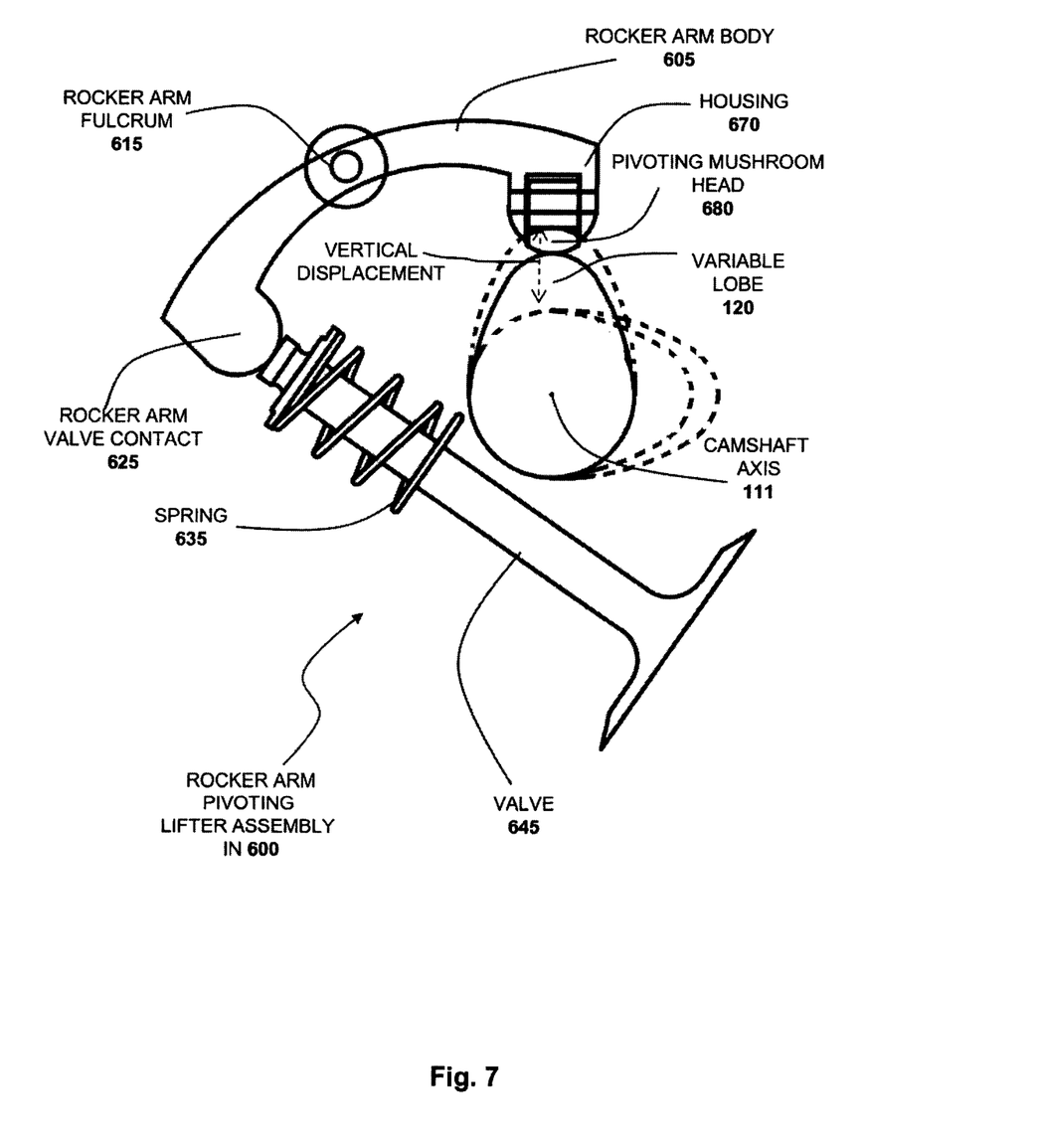
FIG. 7 shows another embodiment of a pivoting lifter assembly 600 with the housing 670 of the pivoting mushroom head 680 constructed integrally with the rocker arm body 60S.

The skilled person will recognize that the pivoting mushroom head component described hereinabove with reference to embodiments relating to lifter assembly 400 may be adapted to other valve lifting assemblies. Thus, there is shown in FIG. 7, a rocker arm pivoting lifter assembly 600.

A rocker arm (in the context of an internal combustion engine of automotive, marine, motorcycle and reciprocating aviation types) is an oscillating lever that conveys radial movement from the cam lobe into linear movement at the poppet valve to open it. One end is raised and lowered by a rotating lobe of the camshaft (either directly or via a tappet (lifter) and pushrod) while the other end acts on the valve stem. When the camshaft lobe raises the outside of the arm, the inside presses down on the valve stem, opening the valve. When the outside of the arm is permitted to return due to the camshafts rotation, the inside rises, allowing the valve spring to close the valve.

In this assembly 600 the rocker arm 605 has an integrally formed housing 670. Alternative embodiments are possible wherein conventional rocker arms are retrofitted to connect a separate housing part similar to that of housing 670. The housing 670 accommodates a pivoting mushroom head 680 using an axle arrangement similar to that described above with reference to FIG. 6.

The rocker arm 605 is pivotably supported by a fulcrum 615 and impacts a valve 645 at a rocker arm valve contact point 625. The movement of the valve 645 is controlled by a spring 635 connected to the valve 645 in a conventional manner. This assembly 600 is appropriate for use with a variable lobe camshaft such as the camshaft shown in FIG. 1A. Also shown in FIG. 7 is a variable lobe 120 of such a camshaft. The movement of the variable lobe 120 about the camshaft axis 111 is also shown as for FIG. 3A.

The skilled person will understand that the lubrication system described with reference to assembly 400 in FIG. 5 may be adapted for use with the rocker arm valve lifter assembly 600 by providing a reservoir within the body of the rocker arm 605 and appropriate channels within the housing 670 and the mushroom head 680 in order to obtain the advantage of providing direct lubrication between the radiused cam lobe contacting surface of the mushroom head 680 and the surface of the cam lobe 120.

Figure 8:
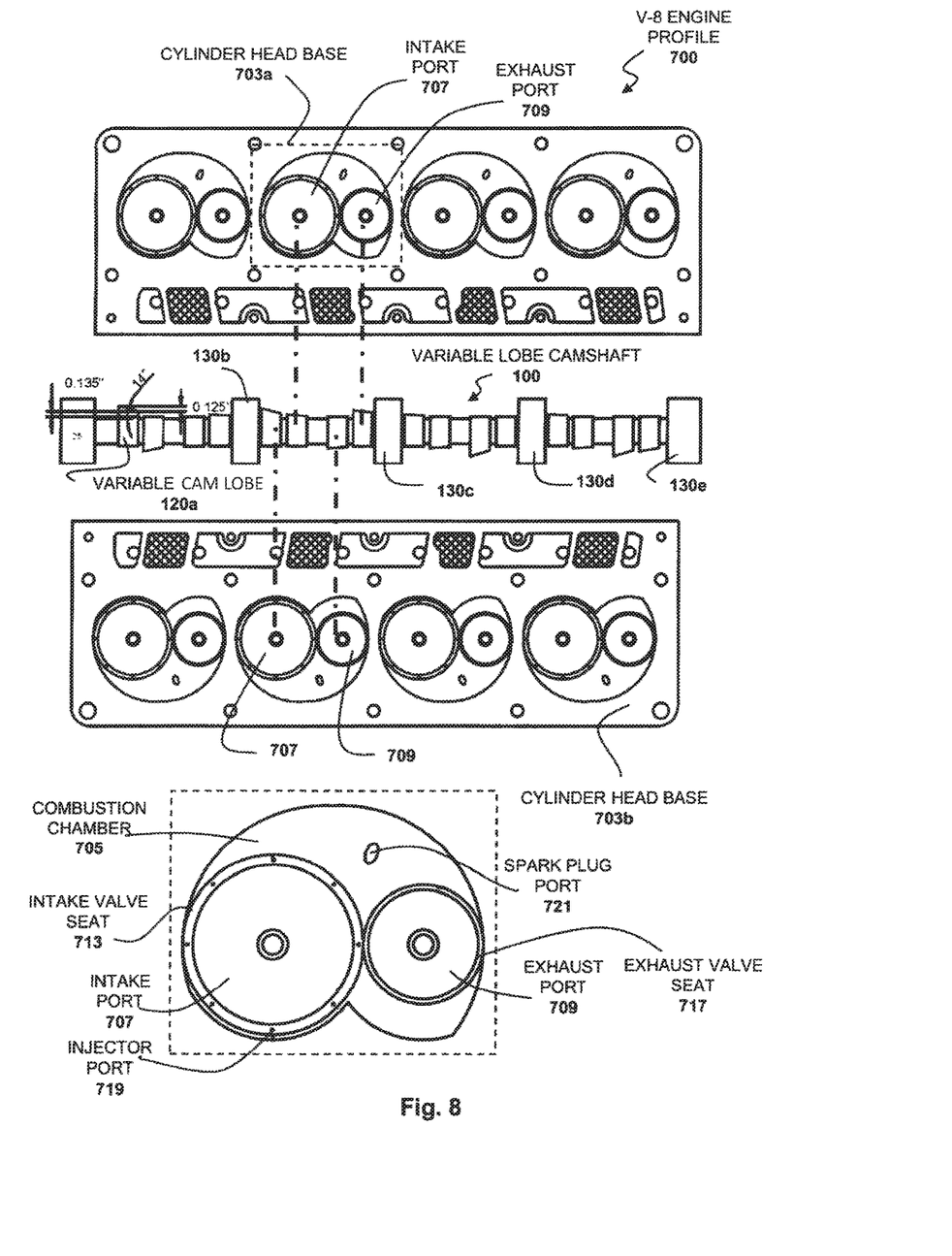
FIG. 8 shows the same variable lobe camshaft 100 as FIG. 1A in an arrangement appropriate for operation with a V-8 engine. The two opposing bases of the V-8 cylinder head (700a and 700b) are oriented with the camshaft 100 between them. The dot-dashed lines extending from the four variable cam lobes between journals 130b and 130c schematically indicate the positioning of rocker arms (not shown} between each variable cam lobe and its respective intake port 707 or exhaust port 709. A representative combustion chamber 705 and selected functional components are shown in the inset, including fuel injector ports 719.

A Rocker Arm-Based Pivoting Valve Lifter Assembly Used in Combination with a Variable Lobe Camshaft in a V-8 Engine As noted above with respect to FIG. 7, the pivoting valve lifter assembly may be configured for use with a rocker arm. Referring now to FIG. 8, there is shown a profile of a V-8 engine 700 which includes opposing cylinder head bases 703a and 703b, each with 4 cylinders. For each cylinder (see inset), there is shown a combustion chamber 705 which includes an intake port 707 with a surrounding intake valve seat 713, an exhaust port 709 and a surrounding exhaust valve seat 717. The view of each combustion chamber 705 also shows the spark plug port 721.

Injector ports 719 are machined into the intake valve seat 713. In this particular embodiment, the valve seat 713 has a total of 8 injector ports. Alternative embodiments will include different numbers of injector ports 719 but advantageously, they are provided in a generally symmetrical arrangement for consistent distribution of fuel. These injector ports 719 control fuel delivery to the engine mechanically. This eliminates the need for expensive computer based managed electronic fuel injection systems as well as allowing for higher injection pressures, possibly as high as 3000 to 5000 psi, which are unachievable with magnetic solenoid fuel injectors. Such pressures would significantly improve fuel droplet atomization and would result in improved fuel combustion and lower emissions. Having the ability to control the valve actuation and duration across the operating rpm range of the ICE provides the means to effectively operate fuel injection as well.

FIG. 8 shows a schematic example of how each of the cam lobes of the variable lobe camshaft 100 (the same camshaft depicted in FIG. 1A) controls the opening and closing of either an intake port 707 or an exhaust port 709 of a particular cylinder combustion chamber 705. The four cam lobes located between cam journals 130b and 130c are used in this example and have dot-dashed lines extending therefrom which each indicate the positioning of a rocker arm-based pivoting valve lifter assembly. Moving from left to right, the first dot-dashed line shows a connection between the leftmost cam lobe and the intake port 707 of the second cylinder combustion chamber from the left in cylinder head base 703b. The second dot-dashed line shows a connection between the next cam lobe and the intake port 707 of the second cylinder combustion chamber from the left in cylinder head base 703a. The third dot-dashed line shows a connection between the third cam lobe from the left and the exhaust port of the second cylinder combustion chamber from the left in cylinder head base 703b. Lastly, the fourth dot-dashed line shows a connection between the fourth cam lobe from the left and the exhaust port of the second cylinder combustion chamber from the left in cylinder head base 703a.

It is to be understood that while only one set of lines indicating rocker arm connections is shown for clarity, there is a full set of 16 rocker arms in this V-8 engine profile with one rocker arm for each of the 16 valve-cam combinations.

When the V-8 engine profile of FIG. 8 is engaged with a set of 1.7:1 rocker arms, each having a configuration similar to that of FIG. 7, each valve could be controlled in an opening range of 0.2295 inches to 0.443 inches. This range provides excellent torque and horsepower at higher engine speed ranges.

Concluding Remarks

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A cam follower for operable attachment to a valve lifter assembly for use with a variable cam lobe camshaft in a variable valve timing system within an internal combustion engine, the cam follower comprising:
    a) a housing with a central cavity; and
    b) a mushroom head with a stem pivotably connected to the housing in the central cavity, the mushroom head having a radiused surface for contacting a cam lobe surface,
    wherein the stem is pivot connected to the housing, by an axle extending through openings in opposing sides of the housing and through the stem of the mushroom head, and
    wherein the housing is operatively connected to a lubrication system for providing lubrication to the mushroom head and the cam lobe surface, the lubrication system comprising:
    a) at least one first channel in the housing extending from a lubricant reservoir in the valve lifter assembly to at least one of the openings in the opposing sides of the housing;
    b) at least one lubricant receiving port in the axle for receiving lubricant passing through the at least one first channel in the housing and at least one lubricant delivery port in the axle for passing the lubricant from the axle to the stem of the mushroom head; and
    c) a second channel in the mushroom head extending from the stem to the radiused surface for passing the lubricant to the radiused surface, thereby providing lubrication to the radiused surface and the cam lobe surface.

2. The cam follower of claim 1, wherein ends of the radiused surface are curved to facilitate sliding engagement of the radiused surface with edges of the cam lobe surface.

3. The cam follower of claim 1, wherein the at least one first channel in the housing is provided by a pair of channels, each channel of the pair extending from the reservoir to one of the openings in opposing sides of the housing, and wherein the at least one lubricant receiving port in the axle is provided by a pair of lubricant receiving ports in the axle, each lubricant receiving port substantially aligned with a corresponding channel of the pair of channels.

4. The cam follower of claim 1, wherein the at least one lubricant delivery port in the axle is located substantially in a longitudinal center of the axle.

5. The cam follower of claim 4, wherein the second channel in the mushroom head is located substantially in the longitudinal center of the mushroom head and substantially aligned with the at least one lubricant delivery port in the axle.

6. A valve lifter assembly for use with a variable cam lobe camshaft in a variable valve timing system within an internal combustion engine (ICE), the valve lifter assembly comprising the cam follower of claim 1 operatively connected to a valve lifter or formed integrally with a valve lifter within the ICE.

7. A variable valve timing system within an internal combustion engine (ICE), the variable valve timing system comprising:
    a) a variable lobe camshaft having a plurality of cam lobes, each cam lobe for controlling the opening of a corresponding valve within the ICE;
    b) a plurality of valve lifter assemblies of claim 6 in operative engagement with corresponding cam lobes of the variable lobe camshaft; and
    c) a plurality of valves in operative engagement with corresponding valve lifter assemblies; the plurality of valves further in operative engagement with corresponding intake ports or exhaust ports of one or more cylinder combustion chambers.

8. The variable valve timing system of claim 7 wherein the camshaft is configured for axial displacement within the ICE.

9. The variable valve timing system of claim 7, wherein each of the plurality of cam lobes has first and second cam lobe faces at opposite ends of each cam lobe and an apex of the first and second cam lobe faces are angularly displaced with respect to one another.

10. The variable valve timing system of claim 7, wherein the intake ports are surrounded with valve seats provided with a plurality of fuel injector ports.

11. The variable valve timing system of claim 10, wherein the plurality of fuel injector ports are eight equally spaced fuel injector ports.

12. A rocker arm valve lifter assembly with a pivoting cam follower for use with a variable cam lobe camshaft in a variable valve timing system within an internal combustion engine (ICE), the rocker arm valve lifter assembly comprising:
   a) a rocker arm with a cam follower housing integrally formed therewithin, the housing having a central cavity; and
   b) a mushroom head with a stem pivotably connected to the housing in the central cavity, the mushroom head having a radiused surface for contacting a cam lobe surface,
   wherein the stem is pivotably connected to the housing by an axle extending through opposing sides of the housing and through the stem of the mushroom head, and wherein the housing is operatively connected to a lubrication system for providing lubrication to the mushroom head and the cam lobe surface, the lubrication system comprising:
   a) at least one first channel in the housing extending from a lubricant reservoir in the valve lifter assembly to at least one opening in the opposing sides of the housing;
   b) at least one lubricant receiving port in the axle for receiving lubricant passing through the at least one first channel in the housing and at least one lubricant delivery port in the axle for passing the lubricant from the axle to the stem of the mushroom head; and
   c) a second channel in the mushroom head extending from the stem to the radiused surface for passing the lubricant to the radiused surface, thereby providing lubrication to the radiused surface and the cam lobe surface.

13. The rocker arm valve lifter assembly of claim 12, wherein edges of the radiused surface are curved to facilitate sliding engagement of the radiused surface with edges of the cam lobe surface.

14. The rocker arm valve lifter assembly of claim 12, wherein the at least one first channel in the housing is provided by a pair of channels, each channel of the pair extending from the reservoir to one of the openings in opposing sides of the housing, and wherein the at least one lubricant receiving port in the axle is provided by a pair of lubricant receiving ports in the axle, each lubricant receiving port substantially aligned with a corresponding channel of the pair of channels.

15. The rocker arm valve lifter assembly of claim 12, wherein the at least one lubricant delivery port in the axle is located substantially in a longitudinal center of the axle.

16. The rocker arm valve lifter assembly of claim 15, wherein the second channel in the mushroom head is located substantially in the longitudinal center of the mushroom head and substantially aligned with the at least one lubricant delivery port in the axle.

* * * * *